United States Patent
Mangalvedhe et al.

(10) Patent No.: US 12,022,378 B2
(45) Date of Patent: Jun. 25, 2024

(54) PHYSICAL BROADCAST CHANNEL TO SUPPORT REDUCED CAPABILITY USER EQUIPMENT BANDWIDTH REDUCTION

(71) Applicant: NOKIA TECHNOLOGIES OY, Espoo (FI)

(72) Inventors: Nitin Mangalvedhe, Hoffman Estates, IL (US); Rapeepat Ratasuk, Inverness, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 251 days.

(21) Appl. No.: 17/478,613

(22) Filed: Sep. 17, 2021

(65) Prior Publication Data

US 2023/0090970 A1 Mar. 23, 2023

(51) Int. Cl.
*H04W 48/10* (2009.01)
*H04L 5/00* (2006.01)
(Continued)

(52) U.S. Cl.
CPC .......... *H04W 48/10* (2013.01); *H04L 5/0007* (2013.01); *H04L 5/0048* (2013.01);
(Continued)

(58) Field of Classification Search
CPC . H04W 48/10; H04W 72/0446; H04W 72/30; H04L 5/0007; H04L 5/0048;
(Continued)

(56) References Cited

U.S. PATENT DOCUMENTS

2019/0090210 A1* 3/2019 Islam .................... H04W 72/30
2020/0359358 A1* 11/2020 Ohara ............... H04W 72/1263
(Continued)

FOREIGN PATENT DOCUMENTS

WO 2020147731 A1 7/2020

OTHER PUBLICATIONS

Nokia, "Narrowband NR for Verticals: Railways, Smart Grids & Public Safety"—Proposal in 5G Standards Virtual War Room #8bis, May 4-6, 2021.
(Continued)

*Primary Examiner* — Ajit Patel
*Assistant Examiner* — Wilfred Thomas
(74) *Attorney, Agent, or Firm* — SQUIRE PATTON BOGGS (US) LLP

(57) ABSTRACT

Systems, methods, apparatuses, and computer program products for physical broadcast channel extension are provided. For example, a method can include mapping, by the network element, symbols of a physical channel to a first set of resource elements. The method can also include identifying, by the network element, a portion of the symbols of the physical channel mapped outside a second set of resource elements. The second set of resource elements can be a subset of the first set of resource elements, The method can further include preparing, by the network element, replacement symbols corresponding to a first portion of the physical channel outside the second set of resource elements. The method can additionally include mapping, by the network element, the replacement symbols to the second set of resource elements in extension symbols. The method can also include transmitting, by the network element, the physical channel and the extension symbols.

19 Claims, 9 Drawing Sheets

(51) Int. Cl.
*H04W 72/0446* (2023.01)
*H04W 72/30* (2023.01)

(52) U.S. Cl.
CPC ....... *H04L 5/0053* (2013.01); *H04W 72/0446* (2013.01); *H04W 72/30* (2023.01)

(58) Field of Classification Search
CPC . H04L 5/0053; H04L 27/2602; H04L 1/0041; H04L 27/261; H04L 5/0044
See application file for complete search history.

(56) References Cited

U.S. PATENT DOCUMENTS

| | | | |
|---|---|---|---|
| 2020/0404601 A1* | 12/2020 | Lin | H04L 1/0061 |
| 2021/0195537 A1* | 6/2021 | Si | H04L 5/0007 |
| 2021/0297999 A1* | 9/2021 | Kim | H04W 72/23 |
| 2021/0345312 A1* | 11/2021 | Xie | H04J 11/0073 |
| 2021/0378016 A1* | 12/2021 | Ohara | H04W 74/0833 |
| 2023/0147138 A1* | 5/2023 | Maki | H04L 5/0078 |
| | | | 714/726 |
| 2023/0171064 A1* | 6/2023 | Yokomakura | H04L 5/0094 |
| | | | 370/329 |

OTHER PUBLICATIONS

Nokia, "RedCap/NR-Light Enhancements in Rel-18," RAN Rel-18 Workshop, RWS-210116, Jun. 28-Jul. 2, 2021.

3GPP TS 38.211 V16.6.0 (Jun. 2021), Technical Specification, 3rd Generation Partnership Project; Technical Specification Group Radio Access Network; NR; Physical channels and modulation (Release 16), Jun. 2021.

Nokia te al., "Revised WID on support of reduced capability NR devices," 3GPP Draft, RP-210918, 3GPP TSG RAN Meeting #91e, Electronic Meeting, Mar. 22-26, 2021.

Qualcomm Incorporated, Remaining details on synchronization signal design; R1-1718526; 3GPP TSG RAN WG1 Meeting 90bis. [online], Oct. 3, 2017, [retrieved on Sep. 28, 2022]. Retrieved from <https://www.3gpp.org/ftp/tsg_ran/WG1_RL1/TSGR1_90b/Docs/R1-1718526.zip>, section 2.2; fig. 1.

International Search Report and Written Opinion dated Oct. 5, 2022, corresponding to International Patent Application No. PCT/FI2022/050471.

\* cited by examiner

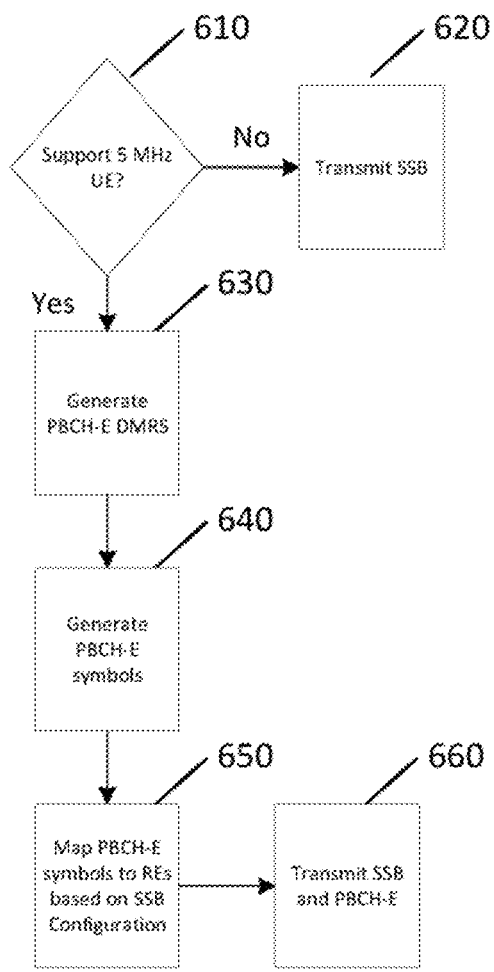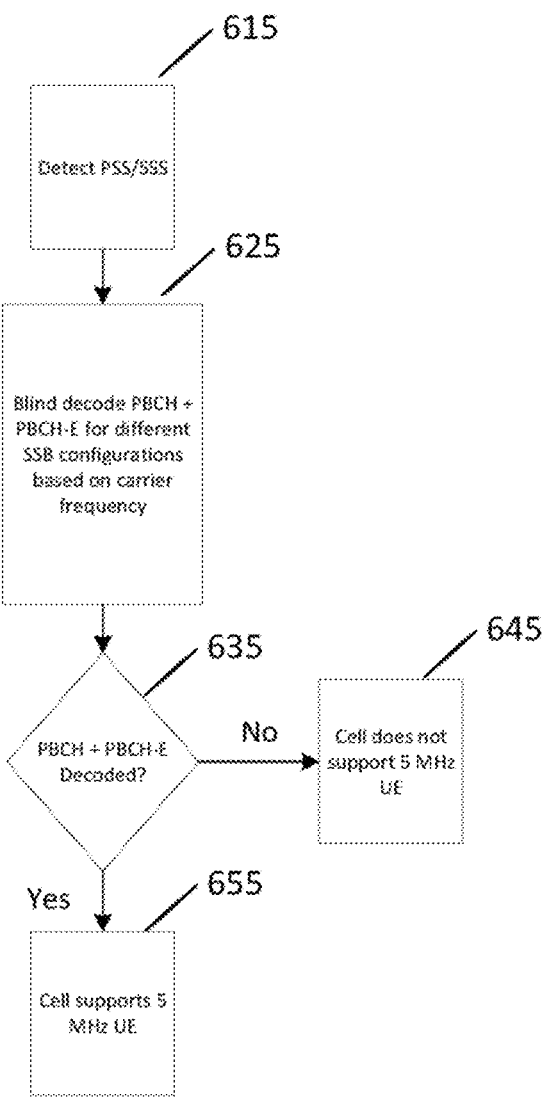
FIG. 6A                                      FIG. 6B

PHYSICAL BROADCAST CHANNEL TO SUPPORT REDUCED CAPABILITY USER EQUIPMENT BANDWIDTH REDUCTION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing physical broadcast channel to user equipment with reduced bandwidth.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus that may include at least one processor and at least one memory comprising computer program code. The at least one memory and computer program code can be configured, with the at least one processor, to cause the apparatus at least to perform a process. The process can include mapping symbols of a physical channel to a first set of resource elements. The process can further include identifying a portion of the symbols of the physical channel mapped outside a second set of resource elements. The second set of resource elements may be a subset of the first set of resource elements. The process can additionally include preparing replacement symbols corresponding to a first portion of the physical channel outside the second set of resource elements. The process can also include mapping the replacement symbols to the second set of resource elements in extension symbols. The process can further include transmitting the physical channel and the extension symbols.

An embodiment may be directed to an apparatus that may include at least one processor and at least one memory comprising computer program code. The at least one memory and computer program code can be configured, with the at least one processor, to cause the apparatus at least to perform a process. The process can include receiving a portion of a physical channel in a first set of resource elements. The whole physical channel may be mapped to a second set of resource elements and the first set of resource elements may be a subset of the second set of resource elements. The process can also include receiving replacement symbols associated with the physical channel and mapped to the second set of resource elements in extension symbols. The process can further include decoding the physical channel based on the receiving the portion of the physical channel and the receiving the replacement symbols associated with the physical channel in the extension symbols.

An embodiment may be directed to a method. The method may include mapping, by the network element, symbols of a physical channel to a first set of resource elements. The method may also include identifying, by the network element, a portion of the symbols of the physical channel mapped outside a second set of resource elements. The second set of resource elements may be a subset of the first set of resource elements. The method may further include preparing, by the network element, replacement symbols corresponding to a first portion of the physical channel outside the second set of resource elements. The method may additionally include mapping, by the network element, the replacement symbols to the second set of resource elements in extension symbols. The method may also include transmitting, by the network element, the physical channel and the extension symbols.

An embodiment may be directed to a method. The method may include
receiving, by a user equipment, a portion of a physical channel in a first set of resource elements. The whole physical channel may be mapped to a second set of resource elements and the first set of resource elements may be a subset of the second set of resource elements. The method may also include receiving, by the user equipment, replacement symbols associated with the physical channel and mapped to the second set of resource elements in extension symbols. The method may further include decoding, by the user equipment, the physical channel based on the receiving the portion of the physical channel and the receiving the replacement symbols associated with the physical channel in the extension symbols.

An embodiment may be directed to an apparatus. The apparatus may include means for mapping symbols of a physical channel to a first set of resource elements. The apparatus may also include means for identifying a portion of the symbols of the physical channel mapped outside a second set of resource elements. The second set of resource elements may be a subset of the first set of resource elements. The apparatus may additionally include means for preparing replacement symbols corresponding to a first portion of the physical channel outside the second set of resource elements. The apparatus may also include means for mapping the replacement symbols to the second set of resource elements in extension symbols. The apparatus may further include means for transmitting the physical channel and the extension symbols.

An embodiment may be directed to an apparatus. The apparatus may include means for receiving a portion of a physical channel in a first set of resource elements. The whole physical channel may be mapped to a second set of resource elements and the first set of resource elements may be a subset of the second set of resource elements. The apparatus may also include means for receiving replacement symbols associated with the physical channel and mapped to the second set of resource elements in extension symbols. The apparatus may further include means for decoding the physical channel based on the receiving the portion of the physical channel and the receiving the replacement symbols associated with the physical channel in the extension symbols.

BRIEF DESCRIPTION OF THE DRAWINGS

For proper understanding of example embodiments, reference should be made to the accompanying drawings, wherein:

FIGS. 6A and 6B illustrate example flow diagrams to implement support for the extension, according to certain embodiments;

DETAILED DESCRIPTION

Figure 1:
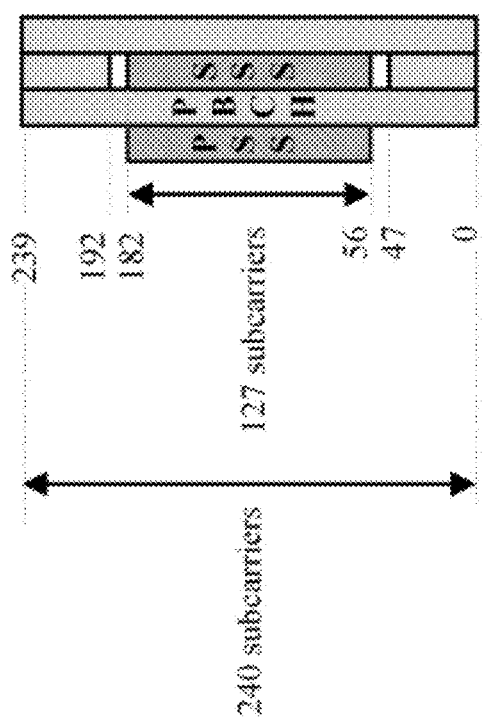
FIG. 1 illustrates the structure of the SSB in accordance with certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing physical broadcast channel extension for a reduced capability (RedCap) new radio (NR) user equipment (UE), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Support of reduced capability NR devices (RedCap devices) is being specified in release 17 (Rel-17). RedCap devices have features that are designed to reduce the cost and complexity of devices that may be used for Internet of things (IoT) use cases including, but not limited to, industrial wireless sensors, video surveillance, and wearables.

Table 1, shown below, provides a summary comparison between reference New Radio (NR) user equipment (UE) and RedCap UE being specified in Rel-17. In Rel-17, RedCap UE has maximum bandwidth of 20 MHz in frequency range 1 (FR1), a frequency range corresponding to 410-7,125 MHz, and 100 MHz in frequency range 2 (FR2), a frequency range corresponding to 24,250-52,600 MHz.

TABLE 1

Summary of Rel-17 RedCap UE.

| | FR1 | | FR2 | |
| --- | --- | --- | --- | --- |
| | Reference NR UE | RedCap UE | Reference NR UE | RedCap UE |
| Device Bandwidth | 100 MHz | 20 MHz | 200 MHz | 100 MHz |
| Antenna Config | FDD: 1Tx-2Rx<br>TDD: 1Tx-4Rx | 1Tx-1Rx,<br>1Tx-2Rx | 1Tx-2Rx | 1Tx-1Rx<br>1Tx-2Rx |
| DL MIMO Support | Yes | Yes for 2Rx | Yes | Yes for 2Rx |
| Duplex Operation | FD-FDD, TDD | FD-FDD, TDD,<br>HD-FDD | TDD | TDD |
| Maximum<br>Modulation | DL: 256-QAM<br>UL: 64-QAM | DL: 256-QAM<br>(optional),<br>64-QAM mandatory<br>UL: 64-QAM | DL: 64-QAM<br>UL: 64-QAM | DL: 64-QAM<br>UL: 64-QAM |

TABLE 1-continued

Summary of Rel-17 RedCap UE.

| | FR1 | | FR2 | |
|---|---|---|---|---|
| | Reference NR UE | RedCap UE | Reference NR UE | RedCap UE |
| Peak data rates | N/A | FD-FDD, 1Rx: 85 Mbps DL, 91 Mbps UL | N/A | 50:50 DL/UL, 1Rx: 212 Mbps DL, 228 Mbps UL |
| Complexity Reduction | — | ~50-60% (1Rx) | — | ~50% (1Rx) |

For FR1 frequency division duplex (FDD), RedCap UE has peak data rates of 85 Mbps in the DL and 91 Mbps in the UL. However, several IoT use cases intended for RedCap may not need such high data rates. For Rel-18, further enhancements for RedCap may include a further reduction in device cost by reducing supported data rate, for example comparable to LTE Cat-1bis UE. This reduction in supported data rate may be accomplished by reducing the maximum supported bandwidth, for example to 5 MHz.

The synchronization signal block (SSB) can include two synchronization signals, a primary synchronization signal (PSS) and a secondary synchronization signal (SSS), as well as the physical broadcast channel (PBCH). The PBCH can carry a higher layer system information message master information block (MIB). To access a cell, a UE can perform synchronization using the PSS/SSS and can acquire the MIB. Based on the information in the MIB, the UE can acquire the remaining minimum system information and other system information.

FIG. 1 illustrates the structure of the SSB in accordance with certain embodiments. The SSB can be transmitted in four adjacent orthogonal frequency division multiplexed (OFDM) symbols. The PSS can be transmitted in the first OFDM symbol and the SSS can be transmitted in the third OFDM symbol of the SSB. Each of these signals can include 127 subcarriers, for example subcarrier indices 56 through 182 within the SSB. The PBCH can be transmitted in the second, third, and fourth OFDM symbols of the SSB, occupying a maximum of 240 subcarriers. In the third OFDM symbol, the PBCH can be mapped to 48 subcarriers on either side of the SSS with a small gap separating the SSS from the PBCH.

As seen from FIG. 1, the frequency span of the SSB can be fixed in terms of the number of subcarriers. This means that the actual bandwidth may depend on the subcarrier spacing (SCS). With 15 kHz SCS, PSS and SSS occupy 1.9 MHz, while PBCH occupies 3.6 MHz. By contrast, with 30 kHz SCS, PSS and SSS occupy 3.81 MHz, while PBCH occupies 7.2 MHz.

As noted above, one of the features being considered for further complexity reduction of RedCap UEs operating in FR1 is reducing the bandwidth to 5 MHz. This will enable support for use cases having data rates that are lower than Rel-17 RedCap UEs but higher than LTE-based LPWA technologies (LTE-M and NB-IoT).

Figure 2:
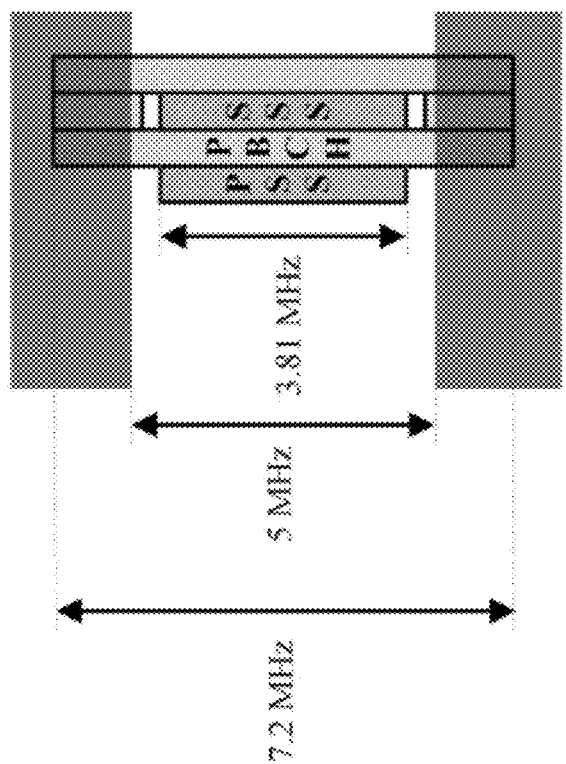
FIG. 2 illustrates reception of synchronization signal block, according to certain embodiments.

From the SSB description above, at 15 kHz SCS, the SSB can be received by a UE with 5 MHz bandwidth. At 30 kHz SCS, however, while the PSS and SSS (with 3.81 MHz) can be received by a 5-MHz UE, the PBCH bandwidth (7.2 MHz) exceeds the UE bandwidth in all three symbols in which the PBCH is transmitted, as depicted in FIG. 2. Therefore, a 5-MHz UE may not be able to decode the PBCH.

FIG. 2 illustrates reception of synchronization signal block, according to certain embodiments. In particular, as shown in FIG. 2, reception of SSB can be performed at 30-kHz SCS by a UE with 5 MHz bandwidth.

Certain embodiments may reuse the existing SSB as much as possible, rather than supporting a separate SSB for 5-MHz UEs, so as not to increase the network overhead. Thus, certain embodiments may provide a backward compatible technological solution that takes advantage of the existing SSB, while overcoming technological challenges associated with being unable to receive parts of the PBCH.

Certain embodiments provide a method for supporting recovery of the signal transmitted in the PBCH outside the bandwidth of the UE using a new signal transmitted within the UE bandwidth but in extension symbols outside the existing SSB.

The PBCH may occupy (240×2)+(48×2)=576 subcarriers, including demodulation reference signal (DMRS), corresponding to 240 subcarriers in the second and fourth OFDM symbols and 48 subcarriers on either side of SSS in the third OFDM symbol. At 30 kHz SCS, if UE can receive 144 subcarriers occupying 4.32 MHz within its usable bandwidth, UE loses (48×3×2)=288 subcarriers of PBCH (i.e., 48 upper subcarriers and 48 lower subcarriers in three OFDM symbols).

Figure 3:
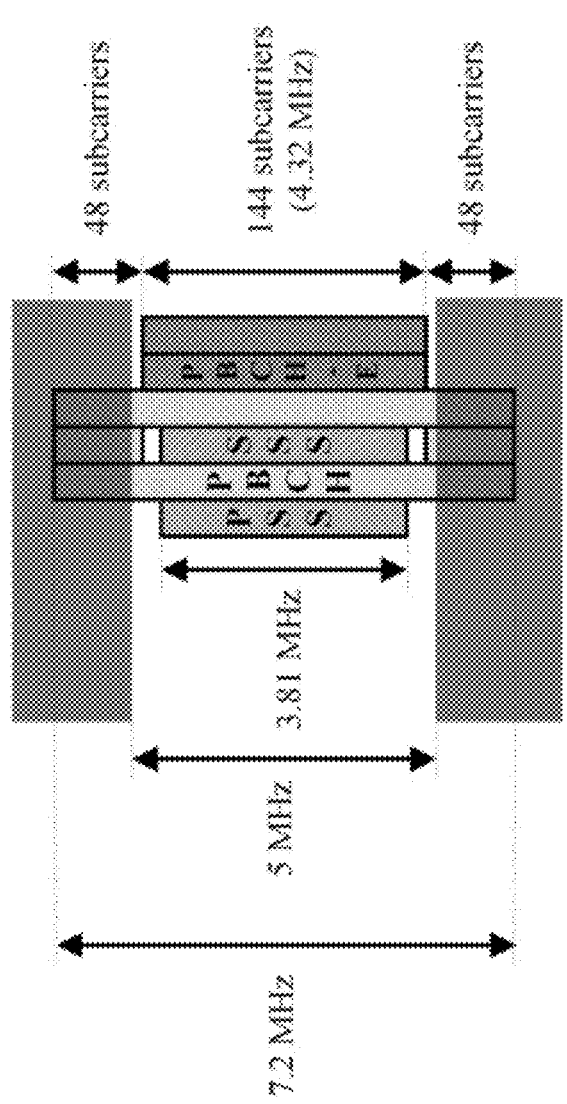
FIG. 3 illustrates extension symbols according to certain embodiments.

FIG. 3 illustrates extension symbols according to certain embodiments. As illustrated in FIG. 3, in certain embodiments, for 30 kHz SCS, two additional PBCH extension (PBCH-E) OFDM symbols, each spanning 144 subcarriers, are transmitted. These extension symbols can replace PBCH signal lost from subcarriers outside UE channel bandwidth. Note that the PBCH-E subcarriers can also be used increase coverage of the PBCH channel for UEs that are capable of receiving all PBCH subcarriers.

There may be various implementations, according to certain embodiments. For example, the signal transmitted on subcarriers in the new OFDM symbols, namely the extension symbols, may either be a direct remapping of symbols of the PBCH on excluded subcarriers or different symbols.

In certain embodiments, the combination of PBCH and PBCH-E, each within 144 subcarriers, can contain the same information (e.g. the Master Information Block) as legacy PBCH.

According to an embodiment, new SSB can be defined for a 30 kHz subcarrier. The new SSB can include a new PBCH that can include the middle 144 subcarriers of the original PBCH and the subcarriers in PBCH-E.

When remapping outer PBCH subcarriers to the subcarriers to PBCH-E, no new signal or symbol generation may be needed. The outer PBCH subcarriers can be those subcarriers outside the 144 corresponding to the RedCap UE's bandwidth. Alternatively, different coded bits than the original PBCH payload bits can be used to generate new modulated symbols that can be mapped to PBCH-E. The two alternatives can be used in combination, such that some of the signal is simply reused and remapped to PBCH-E, while another portion of the signal may be differently coded before being mapped to the PBCH-E.

PBCH-E may be transmitted with a higher periodicity (i.e. less frequently) than SSB. Transmitting PBCH-E with a higher periodicity than SSB may increase the time for acquiring MIB for a low-complexity RedCap UE. This increased acquisition time may be tolerable in the applications for such UEs.

The location of PBCH-E symbols may be based on the SSB pattern and carrier frequency. For each supported SSB pattern, the OFDM symbol indices within a frame in which the SSB is transmitted can be defined depending on the number of SSBs in the configuration.

Information on the presence of PBCH-E can be variously indicated. For example, information on the presence of PBCH-E can be indicated to non-RedCap NR UEs via broadcast or dedicated signaling. The NR UE can assume that resources overlapping with PBCH-E are skipped for PDSCH rate-matching.

For the DMRS in the PBCH-E symbols, the pseudorandom sequence generator initialization at the start of each SSB occasion can include at least one information bit specific to low-complexity RedCap UEs.

Detection of the PBCH-E DMRS, with a different initialization than the PBCH DMRS, can indicate support in the cell for low-complexity RedCap UEs.

A spare bit in the MIB may be used to indicate the presence of an MIB extension that may carry information related to CORESET #0 for the low-complexity RedCap UE.

For 30 kHz SCS, two SSB patterns (first example and second example, discussed below) are supported by the specifications. In certain embodiments, the new PBCH-E symbols can be inserted as described below.

According to a first example, the SSB can start in OFDM symbols $\{4,8,16,20\}+28n$. For f≤3 GHz ($L_{max}=4$): n=0, (this can be called sub-case i) the starting symbol indices are s=4, 8, 16, 20. For 3<f≤6 GHz ($L_{max}=8$): n=0, 1, (this can be called sub-case ii) the starting symbol indices are s=4, 8, 16, 20, 32, 36, 44, 48. The labelling of the sub-cases is just for convenience and does not imply any limitation.

Figure 4:
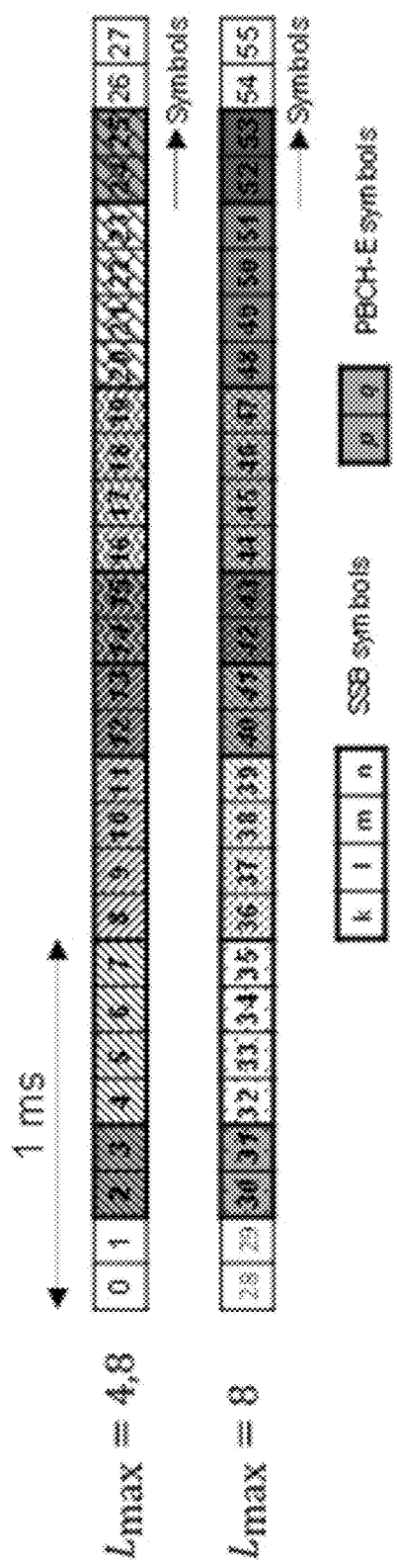
FIG. 4 illustrates insertion of extension symbols in a first example, according to certain embodiments.

In this case, the PBCH-E symbols may be inserted immediately before the first SSB of an SSB pair and immediately after the second SSB of the SSB pair, as illustrated by FIG. 4. FIG. 4 illustrates insertion of extension symbols according to a first example.

In FIG. 4, a different shading pattern is used for the symbols of each SSB. The PBCH-E symbols are shown with a dark background. The first row in the pattern applies to both sub-case i ($L_{max}=4$) and sub-case ii ($L_{max}=8$) whereas the second row in the pattern applies to only sub-case ii ($L_{max}=8$).

According to a second example, the SSB starts in OFDM symbols $\{2, 8\}+14n$. According to sub-case i of this example, f≤3 GHz ($L_{max}=4$): n=0, 1, starting symbol indices are s=2, 8, 16, 22. According to subcase ii of this example, 3<f≤6 GHz ($L_{max}=8$): n=0, 1, 2, 3, starting symbol indices are s=2, 8, 16, 22, 30, 36, 44, 50.

Figure 5:
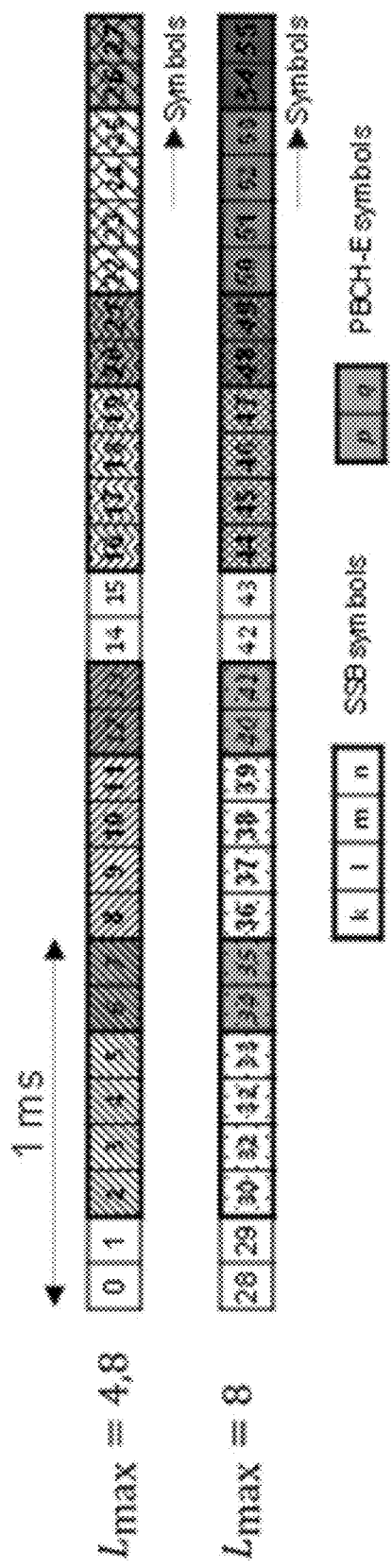
FIG. 5 illustrates insertion of PBCH-E symbols in a second example, according to certain embodiments.

In this case, according to one example embodiment, the PBCH-E symbols may be inserted immediately after each SSB, as illustrated by FIG. 5. FIG. 5 illustrates insertion of PBCH-E symbols in a second example, according to certain embodiments.

In FIG. 5, as in FIG. 4, a different shading pattern is used for the symbols of each SSB. The PBCH-E symbols are shown with a dark background. The first row in the pattern applies to both sub-case i ($L_{max}=4$) and sub-case ii ($L_{max}=8$) whereas the second row in the pattern applies to only sub-case ii ($L_{max}=8$).

A mapping of the encoded PBCH-E symbols and the corresponding DMRS symbols to subcarriers is shown in Table 2, which also shows the mapping of the legacy PBCH and DMRS symbols.

TABLE 2

Mapping of PBCH-E to subcarriers.

| Channel or signal | OFDM symbol number l relative to the start of an SS/PBCH block | Subcarrier number k relative to the start of an SS/PBCH block ($v = N_{ID}^{cell} \mod 4$) |
|---|---|---|
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v, 192 + v, 196 + v, . . . , 236 + v |
| PBCH-E | E1, E2 | 48, 49, . . . , 191 |
| DM-RS for PBCH-E | E1, E2 | 48 + v, 49 + v, . . . , 188 + v |

The OFDM symbol number E1 and E2 of PBCH-E in Table 2 may depend on the SSB pattern and carrier frequency.

In certain embodiments, the next generation Node B (gNB) may use broadcast or dedicated signaling to indicate information related to the presence of PBCH-E to NR (non-RedCap) UEs. Based on this signaling, the NR UE can determine that the resources used for PBCH-E are to be skipped for rate-matching for an overlapping PDSCH. In one embodiment, the gNB may use a single bit in system information to indicate transmission of PBCH-E and the UE may determine the location of the PBCH-E symbols based on the SSB pattern and carrier frequency. Alternatively, the gNB may mark the physical resource blocks (PRBs) and symbols occupied by PBCH-E as unavailable via rateMatch-Pattern configuration using dedicated radio resource control (RRC) signaling.

According to some embodiments, the initialization of the pseudorandom sequence generator at the start of each SSB occasion may be modified as follows:

$$c_{init}=2^{13}(q)+2^{11}(\bar{i}_{SSB}+1)(\lfloor N_{ID}^{cell}/4 \rfloor+1)+2^6 (\bar{i}_{SSB}+1)+(N_{ID}^{cell} \mod 4),$$

where the first term is an example embodiment of the modification and q (e.g., 2 bits) may indicate information specific to RedCap UE.

FIGS. 6A and 6B illustrate example flow diagrams to implement support for the extension, according to certain embodiments. FIG. 6A illustrates procedures for the gNB (a), and FIG. 6B illustrates procedures for the UE.

As shown in FIG. 6A, at 610 the gNB can first determine whether support for 5-Mz UE is needed. If not, at 620 the gNB can transmit SSB according to any standard technique. If such support is desired, however, the gNB can generate a PBCH-E DMRS at 630 and PBCH-E symbols at 640. The generation of PBCH-E symbols may comprise either copying the PBCH symbols outside the middle 144 subcarriers or generation of new modulated symbols from the coded bits used to generate PBCH. The order of these generating procedures does not have to be as shown. At 650, the gNB can further map PBCH-E symbols to resource elements (REs) based on SSB configuration. Then gNB can then transmit the SSB and PBCH-E at 660.

As shown in FIG. 6B, the UE can detect PSS/SSS at 615. The UE can, at 625, blind decode PBCH and PBCH-E for different SSB configurations based on carrier frequency. At 635, the UE can check whether PBCH and PBCH-E have been correctly decoded. If not, the UE can conclude, at 645, that the cell does not support camping of a 5 MHz UE at this raster frequency. Otherwise, the UE can conclude, at 655, that the cell supports 5 MHz UEs. If SSBs are transmitted at multiple frequencies, for example in different bandwidth parts (BWPs), PBCH-E symbols may be transmitted along with SSBs at some frequencies but not others.

Figure 7:
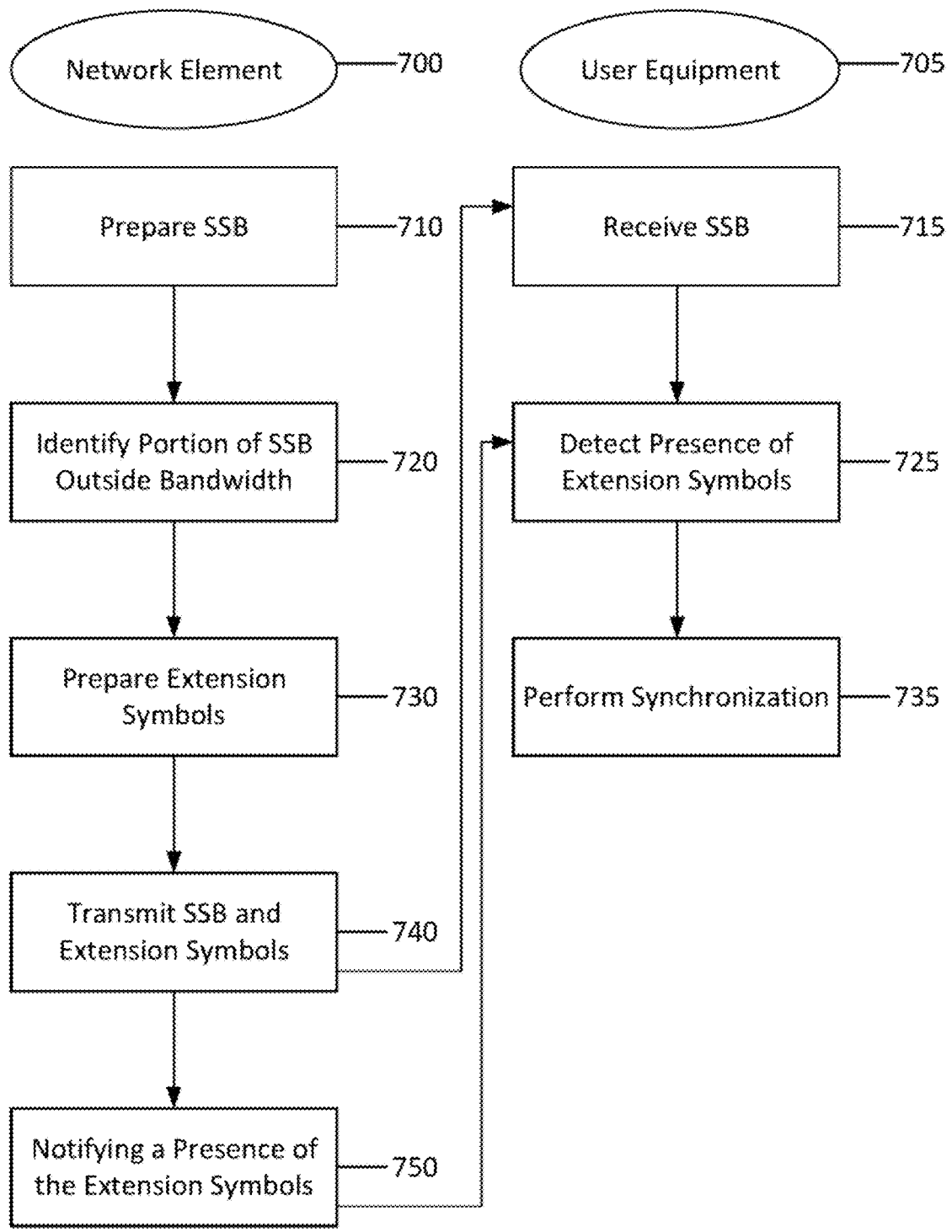
FIG. 7 illustrates an example flow diagram of a method, according to an embodiment.

FIG. 7 illustrates an example flow diagram of a method for providing support for physical broadcast channel extension, according to certain embodiments. The method of FIG. 7 may provide a way to support recovery of the signal transmitted in the PBCH outside the bandwidth of the UE using a new signal transmitted within the UE bandwidth but in extension symbols outside the existing SSB.

As shown in FIG. 7, a method can include procedures performed by a network element 700, for example a gNB, and a user equipment 705. The procedures performed by the network element 700 and user equipment 705 can be performed in combination with each other, as illustrated, or separately from one another.

At 710, the method can include preparing, by a network element 700, a synchronization signal block having a first bandwidth.

At 720, the method can include identifying, by the network element 700, a portion of the synchronization signal block outside a second bandwidth. The second bandwidth can be a subset of the first bandwidth. For example, as described above, the second bandwidth can correspond to a bandwidth of a RedCap UE.

At 730, the method can include preparing, by the network element 700, extension symbols replacing the portion. At 740, the method can include transmitting, by the network element 700, the synchronization signal block and the extension symbols.

The extension symbols can be two orthogonal frequency division multiplexed symbols. Each of the two symbols spans 144 subcarriers.

The preparing the extension symbols at 740 can include remapping symbols from the synchronization signal block, or preparing symbols different from the synchronization signal block.

The combination of the portion of the synchronization signal block within the second bandwidth and the extension symbols can be configured to convey a same information as the synchronization signal block alone. For example, the extension symbols can convey the same information as the portion of the synchronization signal block outside the second bandwidth.

The transmitting the synchronization signal block at 740 can include transmitting the whole synchronization signal block, for example including the portion outside the second bandwidth, or the synchronization signal block without the portion outside the second bandwidth. The latter case can be considered sending a trimmed SSB.

The transmitting the synchronization signal block and extension symbols at 740 can include transmitting the synchronization signal block at a first periodicity and transmitting the extension symbols at a second periodicity higher than the first periodicity.

The transmitting the extension symbols at 740 can include using a location determined according to synchronization signal block pattern and carrier frequency. In other words, the position of the extension symbols with respect to other symbols may depend on both the synchronization signal block pattern and carrier frequency.

The method can further include, at 750, notifying, by the network element 700, a presence of the extension symbols via broadcast signaling or dedicated signaling.

At 715, the method can include receiving, by a user equipment 705, a synchronization signal block having a first bandwidth.

At 725, the method can include detecting, by the user equipment 705, the presence of extension symbols associated with the synchronization signal block.

At 735, the method can include performing synchronization based on the synchronization signal block and the detection of the presence of the extension symbols.

When the user equipment 705 has a bandwidth less than the first bandwidth, the performing the synchronization at 735 can include performing synchronization based on the synchronization signal block and the extension symbols.

When the user equipment 705 has a bandwidth at least equal to the first bandwidth (for example, a non-RedCap UE), the performing the synchronization at 735 can include performing synchronization while skipping the extension symbols for performing rate-matching. For a non-RedCap UE, synchronization (which may rely only on the SSB symbols) may be unaffected by the extension symbols. The rate matching may be for receiving a data channel that may have otherwise also been transmitted in the extension symbols.

It is noted that FIG. 7 is provided as one example embodiment of a method or process. However, certain embodiments are not limited to this example, and further examples are possible as discussed elsewhere herein.

Figure 8:
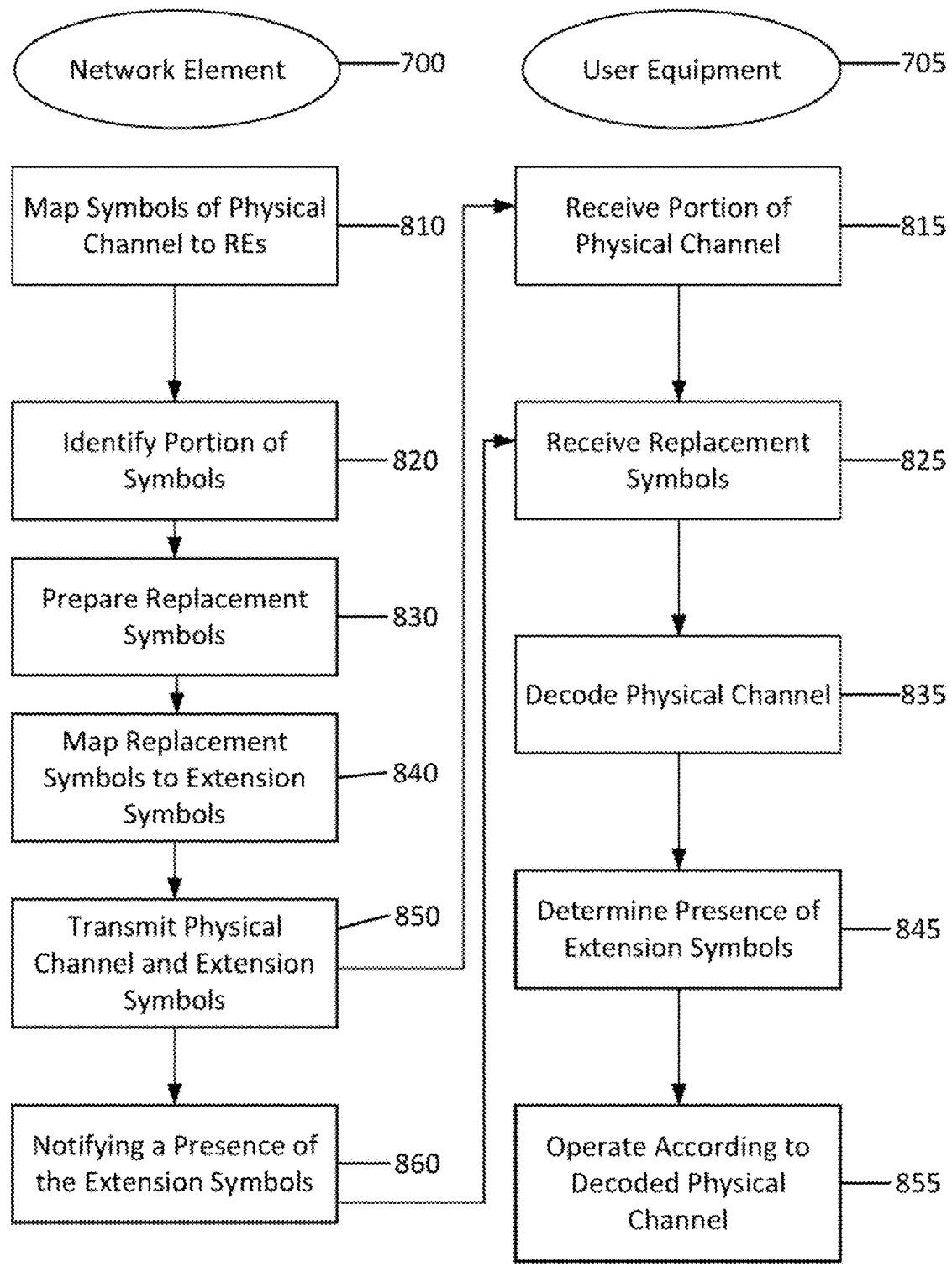
FIG. 8 illustrates another example flow diagram of a method, according to an embodiment.

FIG. 8 illustrates an example flow diagram of a method for providing support for physical broadcast channel extension, according to certain embodiments. The method of FIG. 8 may provide a way to support recovery of the signal transmitted in the PBCH outside the bandwidth of the UE using a new signal transmitted within the UE bandwidth but in extension symbols outside the existing SSB.

At 810, the method can include mapping, by the network element 700, symbols of a physical channel to a first set of resource elements. At 820, the method can also include identifying, by the network element 700, a portion of the symbols of the physical channel mapped outside a second set of resource elements. The second set of resource elements can be a subset of the first set of resource elements.

At 830, the method can further include preparing, by the network element 700, replacement symbols corresponding to a first portion of the physical channel outside the second set of resource elements. At 840, the method can additionally include mapping, by the network element 700, the replacement symbols to the second set of resource elements in extension symbols. At 850, the method can also include transmitting, by the network element 700, the physical channel and the extension symbols.

The physical channel can be a physical broadcast channel contained in a synchronization signal block. The extension symbols can be two orthogonal frequency division multiplexed symbols. The second subset of resource elements can be 144 subcarriers.

The preparing the replacement symbols at 830 can include copying symbols from the first portion of the physical channel, or preparing symbols using coded bits different from coded bits used to generate the symbols of the physical channel.

The combination of a second portion of the physical channel occupying the second set of resource elements and the extension symbols can be configured to convey a same information as the whole physical channel alone.

The transmitting the physical channel at 850 can include transmitting the whole physical channel or just a second portion of the physical channel occupying the second set of resource elements. For example, a remainder of the physical channel, aside from the second portion, may be omitted in at least some transmissions.

The transmitting the physical channel and the extension symbols at 830 can include transmitting the physical channel at a first periodicity and transmitting the extension symbols at a second periodicity higher than the first periodicity.

The transmitting the extension symbols at 850 can include using orthogonal frequency division multiplexed symbol numbers determined according to a time domain transmission pattern of the synchronization signal block and a carrier frequency.

The method can also include, at 860, notifying, by the network element 700, a presence of the extension symbols via broadcast signaling or dedicated signaling. The notifying at 860 can include, for a demodulation reference signal in the extension symbols, a pseudorandom sequence generator initialization at the start of each synchronization signal block occasion can include at least one information bit specific to low-complexity reduced capability user equipment 705.

The method can also include, at 815, receiving, by a user equipment 705, a portion of a physical channel in a first set of resource elements. The whole physical channel can be mapped to a second set of resource elements and the first set of resource elements can be a subset of the second set of resource elements. The method can also include, at 825, receiving, by the user equipment 705, replacement symbols associated with the physical channel and mapped to the second set of resource elements in extension symbols. The method can further include, at 835, decoding, by the user equipment 705, the physical channel based on the receiving the portion of the physical channel and the receiving the replacement symbols associated with the physical channel in the extension symbols. The physical channel can be a physical broadcast channel and the receiving the portion of the physical channel at 815 can include receiving a portion of a synchronization signal block.

The method can also include, at 845, determining, by the user equipment 705, the presence of extension symbols associated with the physical channel. The method can also include, at 855, operating the user equipment according to the decoded physical channel.

The receiving the replacement symbols at 825 can include determining orthogonal frequency division multiplexed symbol numbers of the extension symbols according to a transmission pattern of the synchronization signal block and a carrier frequency.

The determining presence of the extension symbols at 845 can include detecting demodulation reference signals transmitted in the orthogonal frequency division multiplexed symbol numbers of the extension symbols.

It is noted that FIG. 8 is provided as one example embodiment of a method or process. However, certain embodiments are not limited to this example, and further examples are possible as discussed elsewhere herein.

Figure 9A:
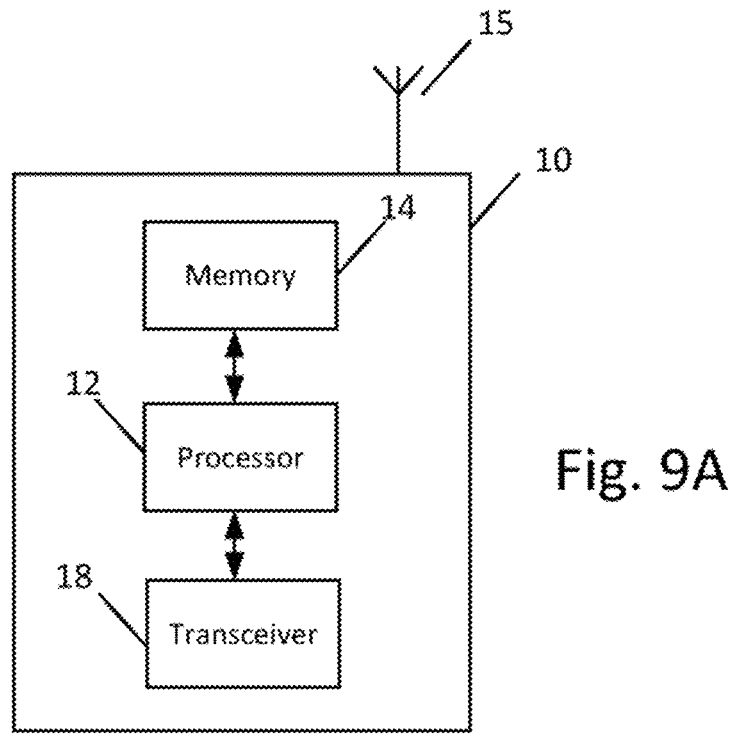
FIG. 9A illustrates an example block diagram of an apparatus, according to an embodiment.

FIG. 9A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9A.

As illustrated in the example of FIG. 9A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 9A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-8, or any other method described herein. In some embodiments, as discussed herein, apparatus 10 may be configured to perform a procedure relating to providing support for physical broadcast channel extension, for example.

Figure 9B:
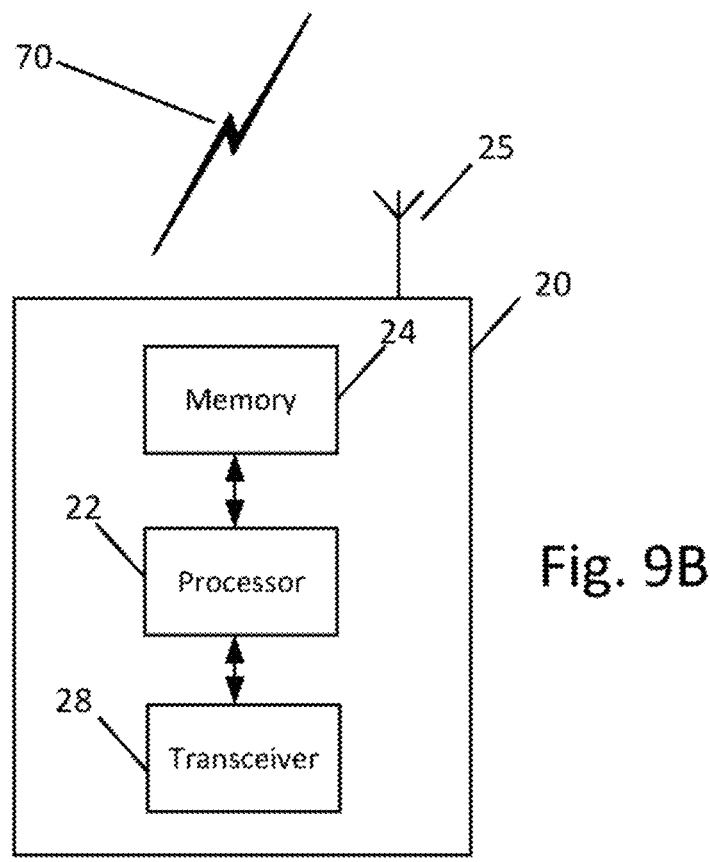
FIG. 9B illustrates an example block diagram of an apparatus, according to an embodiment.

FIG. 9B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9B.

As illustrated in the example of FIG. 9B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-8, or any other method described herein. For example, in an embodiment, apparatus 20 may be controlled to perform a process relating to providing an extension to a physical broadcast channel, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and advantages. For example, certain embodiments can enable low-complexity RedCap UEs with 5 MHz bandwidth to be supported at 30 kHz SCS with legacy systems by reusing legacy SSB symbols transmitted within the UE bandwidth and adding new PBCH-E symbols to recover only the part of PBCH that cannot be received within the UE bandwidth. Certain embodiments of the PBCH-E design may enable the network to signal support for low-complexity UE.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

CORESET #0 Control Resource SET #0
DL DownLink
DMRS DeModulation Reference Signal
FDD Frequency Division Duplex
FR1 Frequency Range 1
FR2 Frequency Range 2
gNB Next Generation Node-B
IoT Internet of Things
LPWA Low-Power, Wide-Area
LTE Long-Term Evolution
LTE-M LTE-based Machine-type communications
MIB Master Information Block
MIMO Multiple-Input, Multiple-Output
NB-IoT NarrowBand IoT
NR New Radio
OFDM Orthogonal Frequency Division Multiplexing
PBCH Physical Broadcast Channel
PBCH-E PBCH Extension
PSS Primary Synchronization Signal
RedCap Reduced Capability
SSB Synchronization Signal Block
SSS Secondary Synchronization Signal
TDD Time Division Duplex
UE User Equipment

We claim:

1. An apparatus, comprising:
at least one processor; and
at least one memory comprising computer program code,
the at least one memory and computer program code configured, with the at least one processor, to cause the apparatus at least to perform a process, the process comprising:
mapping symbols of a physical channel to a first set of resource elements;
identifying a portion of the symbols of the physical channel mapped outside a channel bandwidth of a user equipment in a second set of resource elements, wherein the second set of resource elements is a subset of the first set of resource elements;
preparing replacement symbols corresponding to a first portion of the physical channel outside the channel bandwidth of the user equipment in the second set of resource elements, wherein the preparing the replacement symbols comprises copying symbols from the first portion of the physical channel;
mapping the replacement symbols to the second set of resource elements in extension symbols; and
transmitting the physical channel and the extension symbols to the user equipment.

2. The apparatus of claim 1, wherein the physical channel is a physical broadcast channel contained in a synchronization signal block.

3. The apparatus of claim 1, wherein the extension symbols comprise two orthogonal frequency division multiplexed symbols.

4. The apparatus of claim 3, wherein the second set of resource elements comprises 144 subcarriers.

5. The apparatus of claim 1, wherein the combination of a second portion of the physical channel occupying the second set of resource elements and the extension symbols is configured to convey a same information as the whole physical channel alone.

6. The apparatus of claim 5, wherein the transmitting the physical channel comprises transmitting the whole physical channel or only the second portion of the physical channel occupying the second set of resource elements.

7. The apparatus of claim 1, wherein the transmitting the physical channel and the extension symbols comprises transmitting the physical channel at a first periodicity and transmitting the extension symbols at a second periodicity higher than the first periodicity.

8. The apparatus of claim 1, wherein the transmitting the extension symbols comprises using orthogonal frequency division multiplexed symbol numbers determined according to a time domain transmission pattern of the synchronization signal block and a carrier frequency.

9. The apparatus of claim 1, the process further comprising:
notifying a presence of the extension symbols via broadcast signaling or dedicated signaling.

10. The apparatus of claim 9, wherein the notifying comprises, for a demodulation reference signal in the extension symbols, a pseudorandom sequence generator initialization at the start of each synchronization signal block occasion includes at least one information bit specific to low-complexity reduced capability user equipment.

11. An apparatus, comprising:
at least one processor; and
at least one memory comprising computer program code,
the at least one memory and computer program code configured, with the at least one processor, to cause the apparatus at least to perform a process, the process comprising:
receiving a portion of a physical channel in a first set of resource elements, wherein the whole physical channel is mapped to a second set of resource elements and the first set of resource elements is a subset of the second set of resource elements;
receiving replacement symbols associated with the physical channel and mapped outside a channel bandwidth of the apparatus to the second set of resource elements in extension symbols, wherein the replacement symbols comprise copied symbols from a first portion of the physical channel outside the channel bandwidth of the apparatus in the second set of resource elements; and
decoding the physical channel based on the receiving the portion of the physical channel and the receiving the replacement symbols associated with the physical channel in the extension symbols.

12. The apparatus of claim 11, wherein the physical channel is a physical broadcast channel and the receiving the portion of the physical channel comprises receiving a portion of a synchronization signal block.

13. The apparatus of claim 11, the process further comprising: determining a presence of the extension symbols associated with the physical channel.

14. The apparatus of claim 12, wherein the receiving the replacement symbols comprises determining orthogonal frequency division multiplexed symbol numbers of the extension symbols according to a transmission pattern of the synchronization signal block and a carrier frequency.

15. The apparatus of claim 14, the process further comprising: determining a presence of the extension symbols associated with the physical channel, wherein the determining the presence of the extension symbols comprises detecting demodulation reference signals transmitted in the orthogonal frequency division multiplexed symbol numbers of the extension symbols.

16. A method, comprising:
receiving, by a user equipment, a portion of a physical channel in a first set of resource elements, wherein the whole physical channel is mapped to a second set of resource elements and the first set of resource elements is a subset of the second set of resource elements;
receiving, by the user equipment, replacement symbols associated with the physical channel and mapped outside a channel bandwidth of the user equipment to the second set of resource elements in extension symbols, wherein the replacement symbols comprise copied symbols from a first portion of the physical channel outside the channel bandwidth of the apparatus in the second set of resource elements; and
decoding, by the user equipment, the physical channel based on the receiving the portion of the physical channel and the receiving the replacement symbols associated with the physical channel in the extension symbols.

17. The method of claim 16, further comprising: determining, by the user equipment, a presence of the extension symbols associated with the physical channel.

18. The method of claim 16, wherein the receiving the replacement symbols comprises determining orthogonal frequency division multiplexed symbol numbers of the extension symbols according to a transmission pattern of the synchronization signal block and a carrier frequency.

19. The method of claim 18, further comprising: determining a presence of the extension symbols associated with the physical channel, wherein the determining the presence of the extension symbols comprises detecting demodulation reference signals transmitted in the orthogonal frequency division multiplexed symbol numbers of the extension symbols.

\* \* \* \* \*